United States Patent
Ivanov et al.

(10) Patent No.: US 11,074,311 B2
(45) Date of Patent: Jul. 27, 2021

(54) METHOD AND SYSTEM FOR URL SHORTENING

(71) Applicant: WOWLINK Pte. Ltd., Singapore (SG)

(72) Inventors: Valentin Vyacheslavovich Ivanov, Tashkent (UZ); Vladimir Plakitin, Astrakhan (RU); Konstantin Radov, Singapore (SG)

(73) Assignee: WOWLINK Pte. Ltd., Singapore (SG)

( * ) Notice: Subject to any disclaimer, the term of this patent is extended or adjusted under 35 U.S.C. 154(b) by 0 days.

(21) Appl. No.: 16/891,047

(22) Filed: Jun. 2, 2020

(65) Prior Publication Data

US 2020/0380059 A1 Dec. 3, 2020

Related U.S. Application Data

(60) Provisional application No. 62/856,228, filed on Jun. 3, 2019.

(51) Int. Cl.
| | |
|---|---|
| G06F 16/955 | (2019.01) |
| G06F 16/23 | (2019.01) |
| H04L 29/12 | (2006.01) |
| H04L 29/08 | (2006.01) |
| H04L 29/06 | (2006.01) |
| G06Q 30/02 | (2012.01) |

(52) U.S. Cl.
CPC ...... *G06F 16/9566* (2019.01); *G06F 16/2379* (2019.01); *G06Q 30/0255* (2013.01); *H04L 29/06* (2013.01); *H04L 61/1511* (2013.01); *H04L 61/3025* (2013.01); *H04L 67/02* (2013.01); *H04L 67/04* (2013.01); *H04L 67/18* (2013.01); *H04L 67/22* (2013.01); *H04L 67/306* (2013.01); *H04L 67/34* (2013.01)

(58) Field of Classification Search
CPC . G06F 16/9566; G06Q 30/0255; H04L 29/06; H04L 67/34; H04L 67/306; H04L 67/2204; H04L 67/18
See application file for complete search history.

(56) References Cited

U.S. PATENT DOCUMENTS

2003/0018887 A1* 1/2003 Fishman ............... H04L 29/06 713/151
2017/0076007 A1* 3/2017 Knoll .................. G06Q 30/0255

* cited by examiner

*Primary Examiner* — Kyung H Shin
(74) *Attorney, Agent, or Firm* — Michael D. Eisenberg (57) ABSTRACT

The disclosed system and methods herein are directed to a URL shortening service. The URL shortening service herein processes short URL links by using special scripts embedded into website HTML documents. The need to perform manipulations with DNS of the domain or use subdomains are obviated.

20 Claims, 7 Drawing Sheets

Fig. 7 ated identification for the domain; generating a code; sending the code to the first device; receiving a parameter from the first device; generating: (a) a unique link identification and (b) a short link; sending the short link to the first device; receiving a URL from the second device; retrieving the unique link identification and the parameter in a database; and sending the parameter to the second device. The code is inserted into the domain. The unique link identification is based on the parameter. The short link is subsequently received by the second device. The URL contains the unique link identification and is based on the short link.

METHOD AND SYSTEM FOR URL SHORTENING

CROSS-REFERENCE TO RELATED APPLICATIONS

This application claims priority from U.S. Provisional Application Ser. No. 62/856,228, filed on Jun. 3, 2019, which is hereby incorporated herein by reference in its entirety.

FIELD OF INVENTION

The present invention relates to systems and methods for Uniform Resource Locator (URL) shortening.

BACKGROUND OF THE INVENTION

There are URL (Uniform Resource Locator) shorteners and link management platforms for tracking and sharing short URLs, some of which allow clients to use a custom domain name (also known as a branded domain name) for short URLs. Examples of such services include rebrandly.com, bitly.com, clkim.com, and many others. To use a client's domain name for short URLs, the client needs to set up a Domain Name System (DNS) for that domain to redirect to the server of the URL shortener. The redirecting to the URL shortener server makes that domain unavailable as a website. Another option offered by most of the URL shorteners is (a) creating a subdomain (e.g., go.clientdomain.com) and (b) setting up a subdomain DNS record in such a way that the subdomain is redirecting visitors (i.e., sending request(s) for content) to a URL shortener server. If the user (herein, visitor) clicks on the short link, such as clientdomain.com/123 or go.clientdomain.com/123, then the visitor is: (a) redirected to a URL shortener server; and (b) subsequently redirected to the final destination website.

These URL shorteners require changes in the DNS record for the domain or subdomain, which is a nontrivial task that can take up to 24 hours to update DNS servers for proper functioning. More specifically, certain qualified personnel have sufficient skill needed to properly change the DNS record for the domain and subdomain. More significantly, domain or subdomain changes preclude the domain or subdomain from being used for a website. There is currently no technology or URL management platform providing a function that allows simultaneous use of domains for redirecting URLs and for client's website hosting. For example, if a company has a website, clientdomain.com, then the company cannot use that domain for their short URL without complicated changes in the back-end server scripts and operation. Stated another way, integration of a third party URL shortener is cumbersome and non-facile process.

Additionally, if the company has a website clientdomain.com and wants to use their branded domain for URL shortening, then the company is required to create a new subdomain specifically for URL shortening, for example, go.clientdomain.com. In turn, the short links become: (a) longer, (b) more confusing, and (c) less appealing to consumers. Otherwise, the company is required to disable the website using the domain name.

BRIEF SUMMARY OF EMBODIMENTS OF THE INVENTION

In a variant, a method for URL shortening comprises: receiving a domain from a first device; generating a unique identification for the domain; generating a code; sending the code to the first device; receiving a parameter from the first device; generating: (a) a unique link identification and (b) a short link; sending the short link to the first device; receiving a URL from the second device; retrieving the unique link identification and the parameter in a database; and sending the parameter to the second device. The code is inserted into the domain. The unique link identification is based on the parameter. The short link is subsequently received by the second device. The URL contains the unique link identification and is based on the short link.

In another variant, the first device is a client device.

In yet another variant, the second device is a visitor device.

In a further variant, data of the second device is recorded to the database and instructions are sent to the interstitial page on the second device, in response to finding the unique link identification in the database. The interstitial page comprises a transition block.

In yet a further variant, data of the second device is recorded to the database and instructions are sent to display the access control block script with the interstitial page on the second device, in response to finding the unique link identification in the database.

In yet another variant, data of the second device is recorded to the database and instructions are sent to display the destination URL on the second device, in response to finding the unique link identification and the destination URL.

In yet another variant, the interstitial page is directed to the destination URL in response to processing actions from a user of the second device.

In yet another variant, the interstitial page is directed to the destination URL in response to verifying access control data from a user of the second device.

In yet another variant, the code extracts the unique link identification from the short link.

In yet another variant, the extract is transformed into the URL by inserting the extract into the URL.

In variant, a method for URL shortening comprises: registering a domain from a first device; generating a short URL and a destination address; responsive to generating the short URL, giving a first device access to the destination address; sending the short URL to the first device, wherein the short URL is sent to second device; sending the short URL to the destination address; and sending the destination address directly to the second device, the destination address to the second device via the interstitial page, or the destination address to the second device via access control.

In a variant, a computer implemented system for URL shortening comprises: a processor and memory, with computer readable instructions stored thereon that when read by the processor, cause the processor to perform the instructions to: receive a domain from a first device; generate a unique identification for the domain; generating a code; send the code to the first device; receive a parameter from the first device; generate: (a) a unique link identification and (b) a short link; send the short link to the first device; receive a URL from the second device; retrieve the unique link identification and the set of parameters in a database; and send the parameter to the second device. The unique link identification is based on the parameter. The short link is subsequently received by the second device. The code is inserted into the website on the domain. The URL contains the unique link identification and is based on the short link. The parameter is one of: instructions for displaying a destination URL, instructions for displaying an interstitial page, and instructions for displaying access control block script with the interstitial page.

In yet another variant, the first device is a client device and second device is a visitor device.

In a further variant, data of the second device is recorded to the database and instructions are sent to the interstitial page on the second device, in response to finding the unique link identification in the database. The interstitial page comprises a transition block.

In yet a further variant, data of the second device is recorded to the database and instructions are sent to display the access control block script with the interstitial page on the second device, in response to finding the unique link identification in the database.

In yet another variant, data of the second device is recorded to the database and instructions are sent to display the destination URL on the second device, in response to finding the unique link identification and the destination URL.

In yet another variant, the interstitial page is directed to the destination URL in response to processing actions from a user of the second device.

In yet another variant, the interstitial page is directed to the destination URL in response to verifying access control data from a user of the second device.

In yet another variant, the code extracts the unique link identification from the short link.

In yet another variant, the system includes a web-editor or an app with an editor of the interstitial page. The web-editor or the app is a part of a URL shortener system in use by the first device to create the website. The created website is used for short links associated with the first device as an interstitial page displayed on the second device prior to redirecting to the destination URL.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

DETAILED DESCRIPTION OF THE EMBODIMENTS OF THE INVENTION

The systems and methods herein are directed to a URL shortening and redirection service with branded domains, such that: (a) the need to set up DNS records for the branded domains is eliminated and (b) interstitial pages are enabled. The systems and methods herein can be used for services for: (c) URL management platforms; (d) URL shorteners; (e) click tracking; and (f) marketing which use tracking URLs. Accordingly, clients of such services can: (g) use their own branded domains for their URLs; (h) have simultaneous websites operating on their domains; and (i) obtain statistical and analytical data for the clicks and information about clients who clicked the short links (e.g., browser data, operating system, and device type). In addition to using a client domain for the short URLs, the systems and methods herein allow for a different marketing approach, such as the client's website or webpage is used as an interstitial page that is displayed on the visitor's device prior to getting redirected to the final destination address. The interstitial pages can be created by the clients using interstitial page editor integrated into URL shortener website or application or alternatively can represent client's website or web page and can contain different types of disclaimers, marketing information, ads, information on discounts, and promotions.

The services, as supported by the systems and methods herein, function without interrupting normal operation of client websites running on those domains. The client's websites or web pages are used as interstitial pages displayed on the device of a visitor after clicking on the short URL prior to redirection to the final destination address.

Additionally, the services, as supported by the systems and methods herein, utilize scripts (e.g., JavaScripts) executable on the device of the visitor, hosted on the client website.

Additionally, the services, as supported by the systems and methods herein, allow certain parts of the URL structures (e.g., anchor, directory, subdirectory, or query parameters) to be used as a unique link identifier associated with the final destination address.

The following reference numbers are used throughout the description and correspond to the elements as follows:
2 Database (DB)
101 Client device
102 URL shortener server
103 Domain name (from client device)
104 Registered domain name
105 JavaScript code
106 JavaScript inserted into HTML document
203 Redirection parameters
204 Unique link ID
205 Short URL (as residing on URL shortener server 102)

206 Short link (as residing on client device 101)
301 Visitor device
303 Short URL (as residing on visitor device)
304 JavaScript (as downloaded from website associated with client device)
305 JavaScript (for extracting link ID)
306 JavaScript (for redirecting to URL shortener server 102)
307 Destination URL (as residing in database 2)
308 Visitor data
309 Destination URL (as residing on a URL shortener server 102)
310 Destination URL display content (as residing on visitor device 301)
403 Short URL (as residing on visitor device and template for interstitial page)
404 Client website with Interstitial JavaScript
405 Interstitial JavaScript (for extracting link ID)
406 Interstitial domain information
407 Interstitial redirection parameters
408 Interstitial visitor data
409 Interstitial redirection parameters
410 Interstitial page
411 Interstitial actions (as residing on the visitor device 301)
412 Destination URL (as residing on visitor device via interstitial page)
503 Short URL (as residing on visitor device and template for access control)
504 Client website with Access control JavaScript
505 Access control JavaScript (for extracting link ID)
506 Access control domain information
507 Access control redirection parameters
508 Access control visitor data (as residing on URL shortener server 102)
509 Access control redirection parameters
510 Access control interstitial page
511 Access control visitor data (as residing on visitor device 301)
512 Access control verification (as residing on URL shortener server 102)
513 Destination URL (as residing on visitor device via access control)

With respect to the reference numbers to the data structures above, the term "as residing" refers to a location of the data structures, Referring to FIGS. 1-7, the systems and methods herein support URL shortening URLs services.

Figure 1:
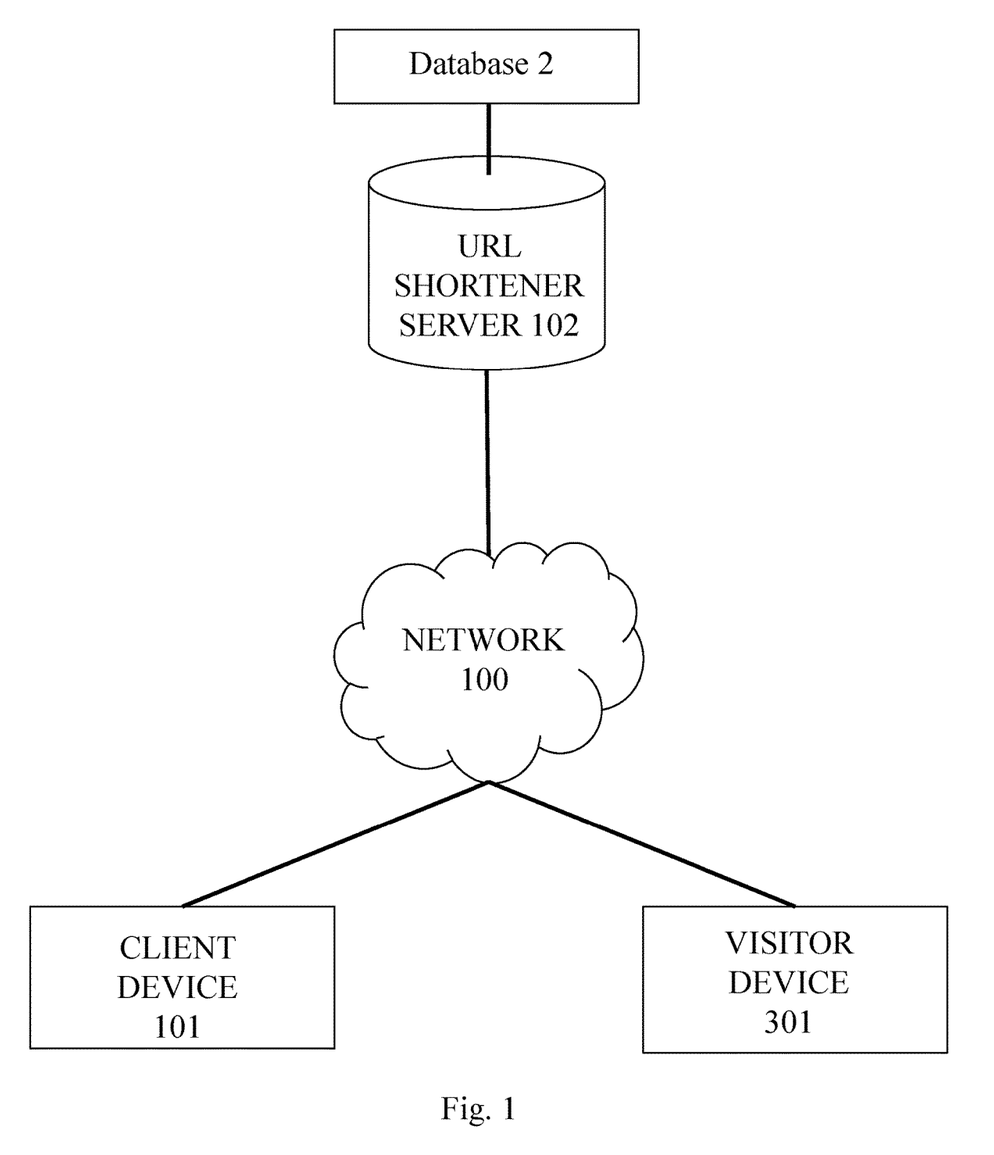
FIG. 1 is a computing environment for supporting the URL shortener server in communication with client and visitor devices.

Referring to FIG. 1, the computing environment contains database of URL Shortener server, URL shortener server 102, client device 101, and visitor device 301 connected to network 100, for the URL shortening services. Network 100 is a digital telecommunications network for sharing resources between nodes (i.e., URL shortener server 102, client device 101, and visitor device 301). URL shortener server 102, client device 101, and visitor device 301 can: (a) provide access to servers, websites, application programming interfaces (APIs), and databases (DBs); or (b) be actual servers, websites, APIs, and databases DBs. This allows the URL shortening service to provides or support: (a) communication with other parties (client and visitor); (b) storage of the information about redirections; (c) links; (d) access to click statistics; and (e) access to analytics. While a single unit of URL shortener server 102, client device 101, and visitor device 301 are depicted in FIG. 1, the systems and methods herein are not limited to a single of each of the aforementioned. A single of unit of the aforementioned are depicted for the purposes of clarity.

Client device 101 is a personal computer (PC), mobile device, smartphone, tablet, or programmable device that has an application (e.g., browser) for displaying webpage content, executing scripts on the webpage (e.g., JavaScripts 105) and communicating with other devices via network 100. Client device 101 can send short links (e.g., short URL 205) from URL shortener server 102. A client is a user of client device 101.

Visitor device 301 is a member of the community that has access to network 100 using a PC, mobile device, smartphone, tablet, or programmable device that has an application (e.g. browser) for displaying webpage content, executing scripts on the webpage. Visitor device 301 can receive short links from client device 101; click on them; and get redirected to the destination address. Visitor device 301 can have the same selection and capabilities as client device 101. The destination address comprises the URL of the webpage, website, server, file, document, and application anywhere on the Internet or local network (e.g., network 100). A visitor is a user of visitor device 301.

Client device 101 can access the destination address, in response to URL shortener server 102 generating short URL 205. Stated another way, short URL 205 redirects client device 101 to the destination address.

Database is connected to URL shortener server 102, to store unique link IDs and URLs.

URL shortener server 102 is a computer program or device which provides functionality for other programs and devices (e.g., client device 101 and visitor device 301). The functionality is directed towards systems and methods herein which provide URL shortening services. Stated another way, client device 101 registers a domain with a URL shortener server 102, which is configured to recognize requests coming from the domain as a legitimate request and process the request. URL shortener server 102 generates a new short URL and receives redirection parameters. The redirection parameters are configured to include: (a) a destination URL, information about a client's domain name to be used for a short URL, (b) information about an interstitial page that is displayed on the visitor device prior to redirection, and (c) the type of action that needs to be taken by the visitor in order to get redirected from the interstitial page to the destination URL. URL shortener server 102 can process the redirection parameters to a destination URL on visitor device 301 in a (a) direct fashion; (b) through an interstitial page defined by the client (user), and (c) access control. Client device 101 can change redirection parameters.

A method for URL shortening services includes registering a domain 104 with a URL shortening service (e.g., URL shortener server 102). Short URL 205, as generated on URL shortener server 102, is sent to destination URL 307 either: (a) directly to visitor device 301; (b) to visitor device 301 through an interstitial page (e.g., interstitial page 410 as defined by the client; or (c) to visitor device 301 through access control.

A system for a URL shortening services comprises a registered domain 104, a short URL 205, a destination URL 307, a client device 101 configured to connect to the system via URL shortener server 102, redirection parameters 203 configured to display information about a registered domain name 104, and interstitial page(s) configured to redirect the user to the destination URL 307. URL shortener server 102 and client device 101 are configured to be in communication with each other. URL shortener server 102 and client device 101 are each configured to receive and send a short URL 206 via social media applications and messaging services between: (a) URL shortener server 102 and client device 101; and (b) URL shortener server 102 and various devices (e.g., multiple units of visitor device 301) on network 100.

A browser on visitor device 301 downloads the content of the webpage with JavaScript provided to client device 101 by URL shortener server 102, and executes a JavaScript code which extracts the unique link ID from the URL.

Figure 2:
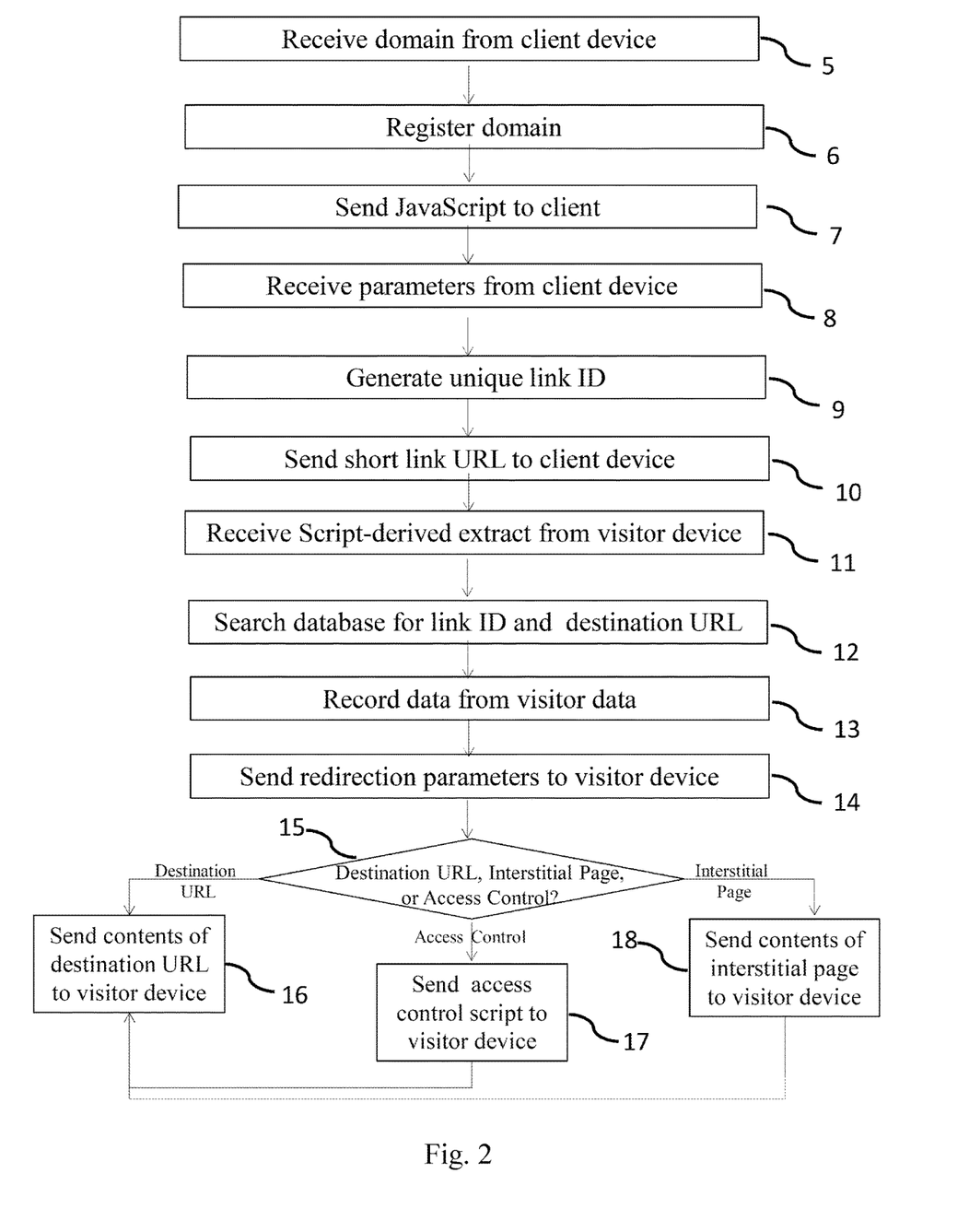
FIG. 2 is a flowchart for registering a new domain, generating the new short URL.

Referring to FIG. 2, URL shortener server 102 performs the steps and processes in the flowchart therein. Steps 5-7 involve registering a new domain in URL shortener server 102. Steps 8-10 involve sending a generated short URL to client device 101. Steps 11-18 involve communications between URL shortener server 102 and visitor device 301.

Client device 101 connects to URL shortener server 102. Thereby, a client via client device 101 is using URL shortening service. URL shortener server 102 receives a domain from client device 101 in step 5 and subsequently registers the domain with the URL shortening service in step 6. An account is configured with the URL shortening service such that URL shortener server 102 controls access privileges to the URL shortening service functionalities.

In step 7, URL shortener server 102 sends JavaScript code which contains the unique link ID to client device 101. Additionally, the JavaScript code sends a URL to URL shortener server 102 and inserts the extracted unique link ID into the formed URL as part of the URL.

In step 8, URL shortener server 102 receives long link and redirection parameters from client device 101. Redirecting parameters are for instructions to: (a) display a destination URL directly on visitor device 310; (b) display a destination URL directly on visitor device 310 through an interstitial page defined by the client (user); or (c) display a destination URL directly on visitor device 310 with access control. Redirection parameters are also configured to display information about a domain name.

In step 9, URL shortener server 102 generates a unique link ID (e.g., 123). In turn, short URLs are recorded by URL shortener server 102 by sending the short URL setting to DB 2. Thus, the service can generate unique link ID, while receiving created new short URL links. The identifiers in short link (anchors) may have a form of a consequence of random symbols, e.g. #qE40Jd7, #13Dm9, etc. Alternatively, the client may define the identifiers in the short link URL by itself to make the short link URL more recognizable and easier to memorize. For example, the anchor may instead be #product1, #product2, #product3. URL shortener server 102 checks the suggested identifier for uniqueness. If the identifier is already present in (and also retrievable from) DB 2, then the client is prompted to suggest another identifier. The clients can associate an interstitial page with some of their short links. In that case the unique identifier of those links in the database of the service is associated with the selected by user interstitial page. This is displayed on the screen of clients or visitors who clicked on the short links, prior to redirecting them to the final destination address.

In step 10, URL shortener server 102 sends a short link URL to client device 101. Each short link URL has unique link, which includes the domain name, as generated by URL shortener server 102 and is defined by the client's branded domain name. Social media and messengers share a short link URL with client device 101.

In step 11, URL shortener server 102 receives JavaScript-derived extract from visitor device 301. As discussed with respect to FIG. 5, a short link URL is received by visitor 301 from client device 101. A browser on visitor device 301 downloads the content of the webpage with JavaScript provided by URL shortener server 102 to client device 101, and executes a JavaScript code which extracts the link ID from the URL. A request, via JavaScript is sent to URL shortener server 102 with the information on the domain and the link ID.

In step 12, URL shortener server 102 searches Database 2 for link ID and destination URL. Thereby, URL shortener server 102 can find and retrieve stored redirection parameters in Database 2 for the received link ID.

In step 13, URL shortener server 102 records visitor data to Database 2.

In step 14, URL shortener server 102 sends the redirection parameters to visitor device 301.

Figure 6:
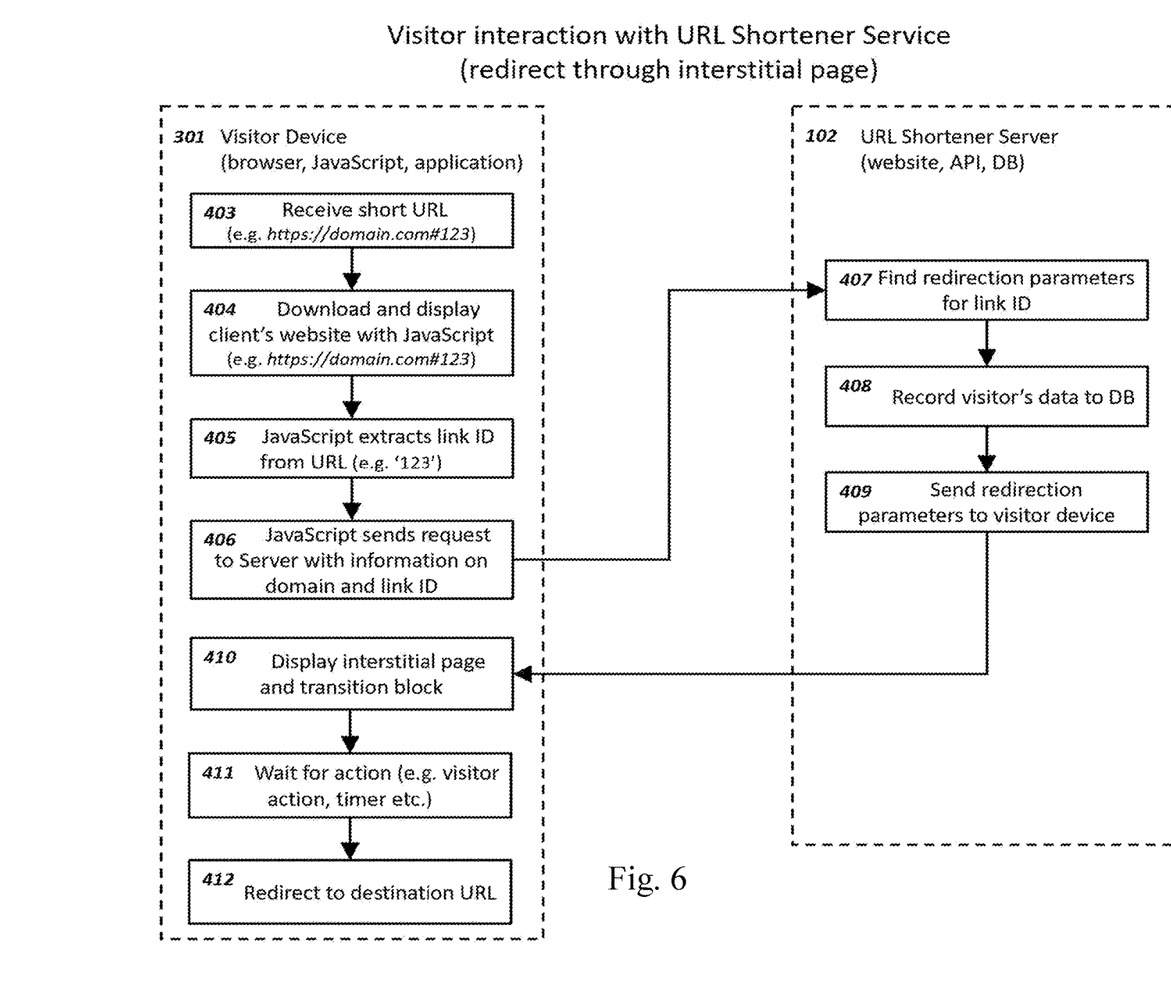
FIG. 6 is a block diagram and flowchart of the visitor communication with the URL shortener server for a redirect process to the destination URL via an interstitial page.
Figure 7:
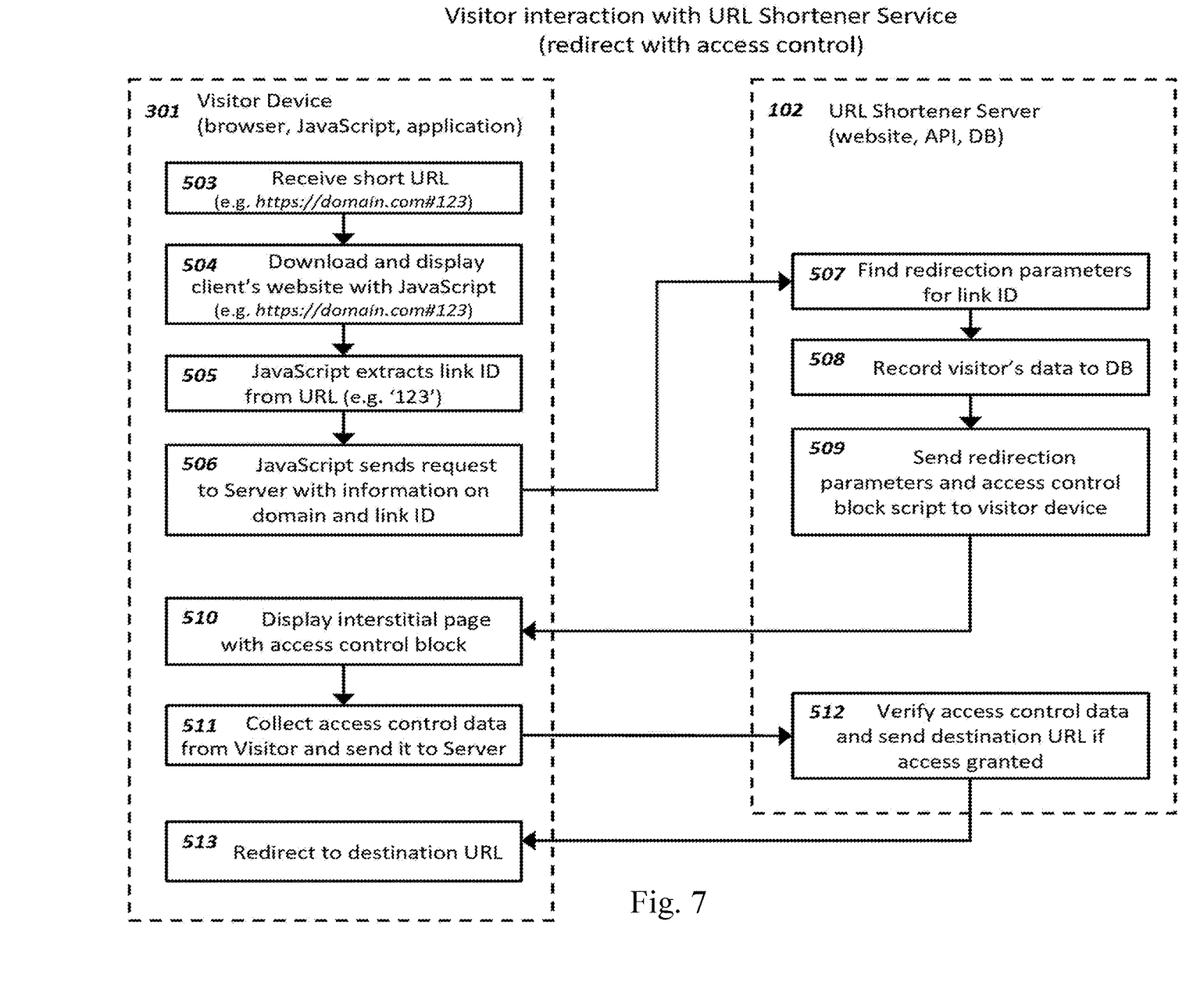
FIG. 7 is a block diagram and flowchart of the visitor communication with the URL shortener server for a redirect process to the destination URL via an interstitial page with access control.

In step 15, URL shortener server 102 determines if the redirection parameters to be a destination URL (as described with respect to FIG. 5), interstitial page (as described with respect to FIG. 6), and interstitial page with access control (as described with respect to FIG. 7). Stated another way, the redirection parameters are sent to visitor device 301 as: (a) directions to display the destination URL; (b) directions to display to the interstitial page; or (c) directions to display the interstitial page with access controls.

In step 16, URL shortener server 102 sends the contents of the destination URL directly to visitor device 301 if URL shortener server 102 determines the redirection parameter to be a destination URL.

In step 17, URL shortener server 102 sends access control script to visitor device 301 if URL shortener server 102 determines the redirection parameter to be an access control script. Following validation step, as described with respect to FIG. 7, the destination URL is displayed in visitor device 301.

In step 18, URL shortener server 102 sends interstitial page to visitor device 301 if URL shortener server 102 determines the redirection parameter to be an interstitial page. Following the steps, as described with respect to FIG. 6, the destination URL is displayed in visitor device 301.

For interstitial pages, scripts are embedded into HTML of the main page of the domain that is supposed to be used for short links and backend scripts on URL shortener server 102 of, for example, the Link Management Platform required for proper functioning of the short link URLs. A user only has to add few lines of code to the main page of the site. Example of this script is given below:

```
<script>
    (function( ) {
        var h = window.location.hash.substr(1);
        if(!h.length) return;
        var r= new XMLHttpRequest( );
            r.open('GET',
'https://URL_TO_MANAGEMENT_PLATFORM/'+h, false);
            r.send(null);
            eval(r.responseText);
        })( );
</script>
```

This obviates the need to perform any manipulations with DNS of the domain or subdomain. The only action required to connect domain to the URL Shortening Service (or Link Management Platform) is to add (or insert) the above script onto the main page of the website. This can be done by webmaster via standard interfaces of CMS or manually by amending main page .html or .php file (e.g. index.html or index.php).

Figure 3:
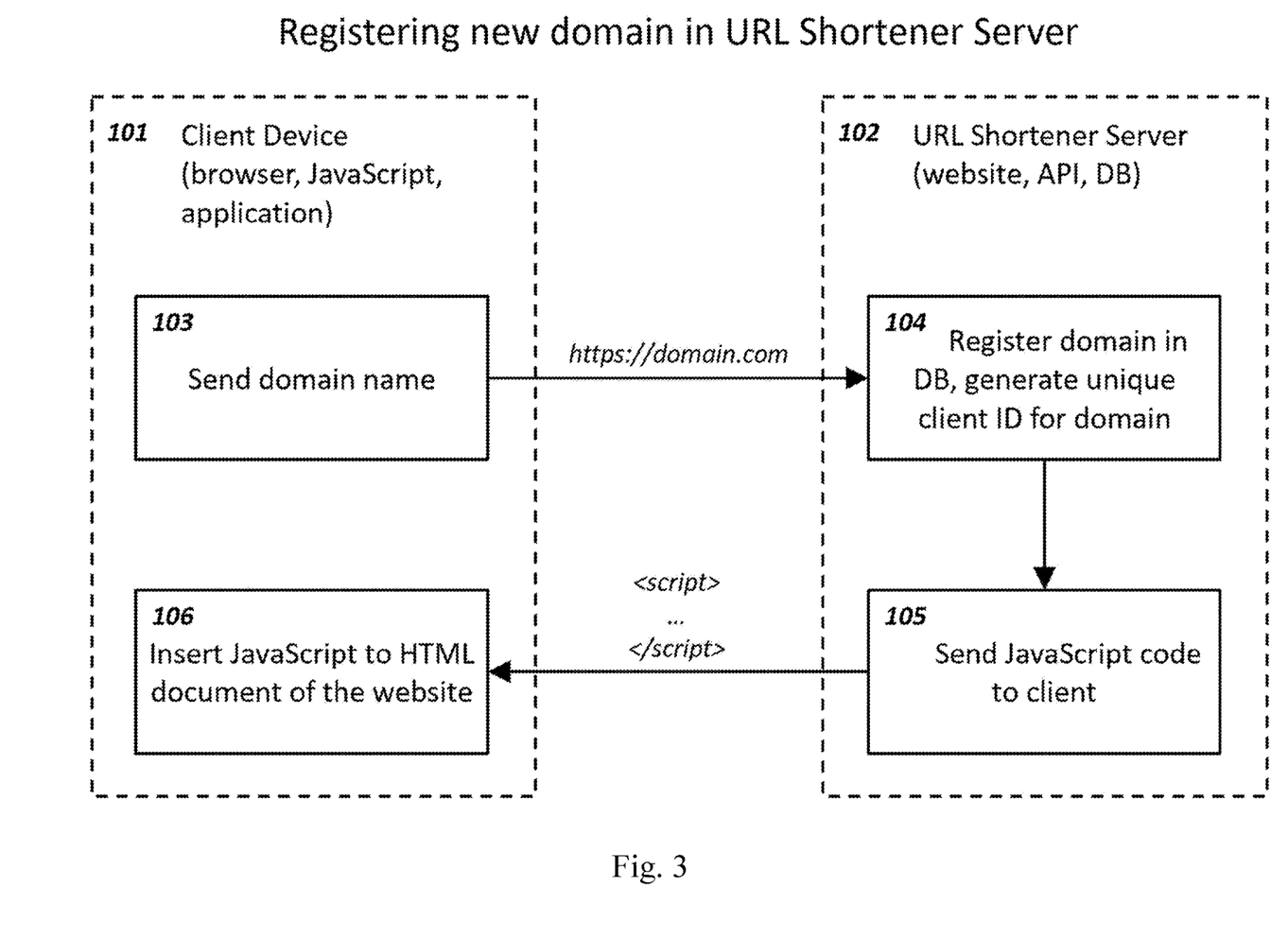
FIG. 3 is a block diagram and flowchart of the steps for registering a new domain in the URL server.

Referring to FIG. 3, a functional block diagram depicts communications between client device 101 and URL shortener server 102. Domain name 103 is sent from client device 101 to URL shortener server 102, which registers a domain as registered domain name 104. This allows client device 101 to access registered domain 104 with a URL shortening service, which recognize requests coming from that domain 104 as a legitimate request and process the request properly. Using URL shortener server 102 (website, app or 3$^{rd}$ party website or app that uses URL shortening services API), client device 101 specifies the name of domain 104 for use in URL shortening, for example, domain.com. Accordingly, URL shortener server 102 receives domain 104. URL shortener server 102 checks the validity of domain name 104. Instances where domain 104 is successfully validated, URL shortener server 102 sends the domain name 104 to Database 2 (i.e., registering the domain in DB 2) and generates unique link ID 204 for domain name 104. Unique link ID 204 for the domain name 104 can be used by the service for further access control and determining if the requests coming from visitor device 301 or client device 101 are legitimate requests. URL shortener server 102 generates a JavaScript code 105, which is sent to client device 101. JavaScript code 105 is inserted one time into the client's HTML code 106 located in the specified registered domain name 104. HTML document 106 is an HTML document, such as domain.com/index.html. The JavaScript may be executed when the webpage on the branded domain name domain.com is displayed on visitor device 301, where communication and certain information exchanges with URL shortener server 102. This provides redirection functionality for the registered branded domain 104.

URL shortener server 102 sends the generated JavaScript code 105 to client device 101 by: (a) providing the text of the JavaScript code on the web page and (b) allowing copy and paste functions on text. The copied and pasted text the webpage of the service is inserted or placed into to the HTML document on the client's website by URL shortener server 102. Upon receipt of the generated JavaScript code 105, URL shortener server 102 allows the client to inserts JavaScript code 105 into an HTML document 106 of the web page to be used for URL shortening. Alternatively, the service can provide the link to the file on URL shortener server 102 containing the JavaScript 105. Thus, client device 101 is obviated from inserting the whole JavaScript code 105 into the client webpage.

Figure 4:
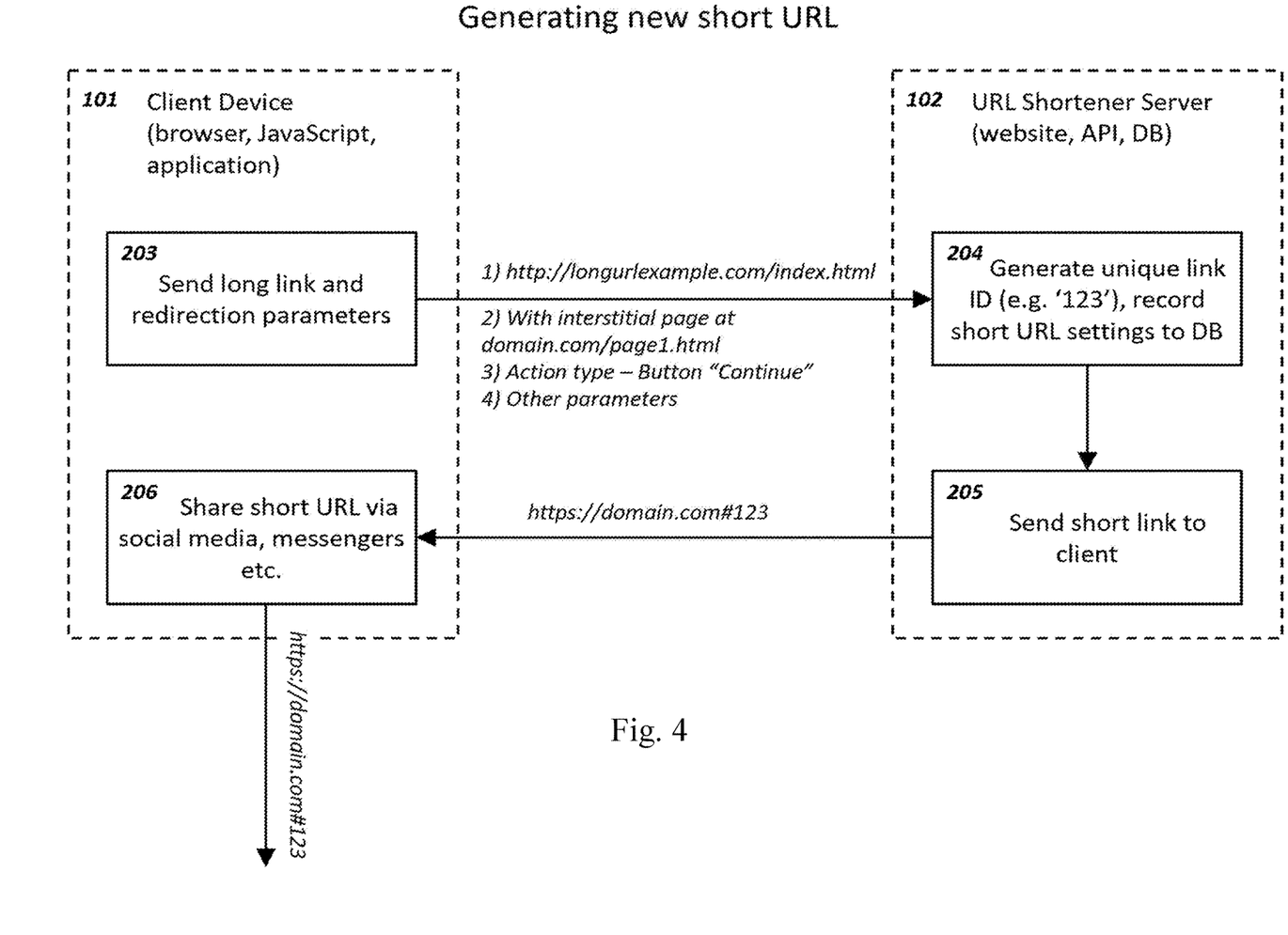
FIG. 4 is a block diagram and flowchart of the steps for generating a new short URL.

Referring to FIG. 4, URL shortener server 102 generates new short URL 205, in response to URL shortener server 102 receiving redirection parameters 203. URL shortener server 102 successfully processes a branded domain name. URL shortener server 102 allows (a) client device 101 to use the branded domain name for (b) generating a short URL 205 (https://domain.com#123) that can (c) redirect to the address specified by client device 101, while (d) generating unique link ID 204 (e.g., '123'). If the website https://domain.com is accessed by visitor device 301 through a URL without unique link ID 204, (e.g. '123') the JavaScript 105 does not call for redirection and the usual content of the website is displayed.

Redirection parameters 203 include but are not limited to: a destination URL 307 (long URL, for example http://longurlexample.com/index.html); information about a client's domain name to be used for short URL 205 (e.g. domain.com); information about an interstitial page that is displayed on visitor device 301 prior to redirection; and the type of action that needs to be taken by visitor device 301 to get redirected from the interstitial page to the destination URL 307. An example of such an action is: (a) clicking on a "Continue" button or (b) waiting for a certain amount of time prior to redirection. The action required for redirection can be also related to access control or limitation of the access to the final destination URL 307 (e.g., password protection). Thus, visitor devices 301 that have a certain password are redirected to the destination URL 307. In this case, the package of the information transmitted in redirection parameters 203 to the service may include a password (or a password hash).

Client device 101 can also send a desirable unique link ID 204 with redirection parameters 203. For example, client device 101 may want to use a certain combination of letters or words for his short link (e.g. domain.com#news) instead of unique link ID 204. URL shortener server 102, which generates the unique link ID 204, determines if the suggested link ID 204 is unique. If there is no suggested link ID provided by client device 101 (i.e., URL shortener server 102 does not receive a suggested link ID), URL shortener server 102 generates a unique link ID 204, for example '123'. URL shortener server 102 sends the generated short URL 205 with unique link ID 204 back to client device 101. Client device 101 receives short URL 205 with unique link ID 204 as short link 206. Short link 206 can be shared via social media channels or other communication channels to visitor device 301. Thus, the short link, e.g. domain.com#123 can be accessed via visitor device 301 and get redirected to the interstitial page or directly to the destination URL. The interstitial page can be (a) the same page as a main page of the client's website (domain.com) or (b) another page on the same or other registered in the service domain (domain.com/page1.html). The interstitial page contains the JavaScript 105, which is the same script as when the domain is registered.

Figure 5:
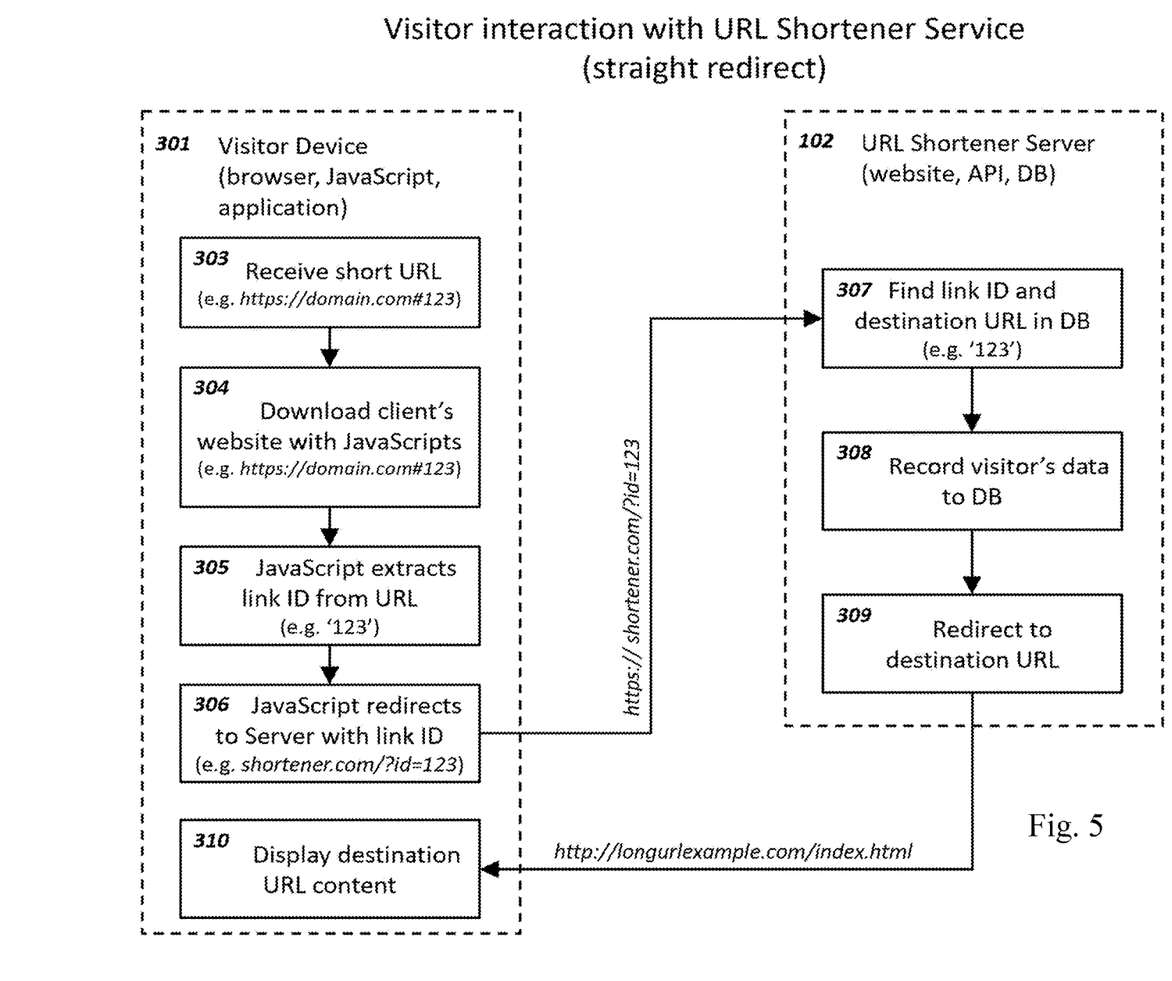
FIG. 5 is a block diagram and flowchart of the visitor communication with the URL shortener server for a redirect process directly to the destination URL.

Referring to FIG. 5, communication between visitor device 301 and URL shortener server 102 occurs via a directly redirect process after visitor device 301 receives short URL 303 as, for example, https://domain.com#123, through social channels, messenger, or other communication channels. The browser on the visitor device 301 can (a) download the content of the webpage https://domain.com with JavaScript 304 (or a link to JavaScript from URL shortener server 102), as (b) provided to client device 101, and (c) execute a JavaScript code 305 which extracts the link ID (e.g. '123') from the URL (e.g. HYPERLINK "https://domain.com" \l "123" https://domain.com#123). Extraction of unique link ID 104 as part of the URL can be done in JavaScript 305 by techniques known in the art. JavaScript 306 can (d) send a URL to URL shortener server 102 and (e) insert the extracted link ID into the formed URL as part of the URL. The part of the URL is, for example, a query parameter (e.g., https://shortener.com/?id=123) or an anchor (e.g. https://shortener.com#123), which is directly redirected to or from URL shortener server 102.

JavaScript 306 may also transmit other parameters, such as domain name (e.g. domain.com), unique link ID 204, or other information required by the URL shortening services. URL shortener server 102 can: (a) receives the request with the URL, link ID, other transmitted information from visitor device 301, and (b) find the destination URL 307, which is associated with the received unique link ID 204. URL shortener server 102 may record visitor data 308, which is sent to Database 2. This is used for click tracking purposes. URL shortener server 102 redirects the visitor to the destination URL 309. Visitor device 301 can in turn: (c) receive a redirect request from URL shortener server 102, (d) download destination URL display content 310; and (c) display the destination URL display content 310. If there is (e) no link ID 204 in the URL that the visitor receives at step 303 and (f) an unsuccessful attempt to detect link ID 204 in short URL 305, then (g) the JavaScript is not transformed to JavaScript 306. This allows the webpage at domain.com to be displayed in its usual mode as a website.

Referring to FIG. 6, interstitial JavaScript 405, which extracts link ID 204 from short URL 403 (e.g., JavaScript as residing on visitor device and template for interstitial page), sends a request (e.g., AJAX); the information on the domain (e.g. the domain name itself domain.com or unique link ID 204 for domain 104); and interstitial domain information 406 to URL shortener server 102. URL shortener server 102 finds and retrieves redirection parameters 407 in the database 2 for the received unique link ID 204 and records interstitial visitor data 408 for further click statistics and analytics services provided to client 101. Redirection parameters 203 for the link ID are defined by the client while creating a unique link 204. URL shortener server 102 sends interstitial redirection parameters 409, including the destination URL back to visitor device 301. The browser on visitor device 301 downloads and displays interstitial page 410 with a transition block. Interstitial page 410 can be one of the pages of client website 404 with interstitial JavaScript. For example, the page https://domain.com/page1.html, which (a) has the same special JavaScript code, as (b) provided by URL shortener server 102, while (c) registering the client's domain with the service. The interaction between Javascript on the main page of the client's domain (e.g. https://domain.com) and the interstitial page can be similar to interaction between the services. JavaScript on the main page sends the interstitial redirection parameters 409, such as type of the action and destination URL, to the interstitial page by using anchor or query parameters. JavaScript on the interstitial page 410 displays the corresponding transition block. When the predefined redirection parameter 203 is: (a) interstitial action 411 (time elapsed, or visitor clicked the button) and (b) executed, "Continue" or "Accept and continue to destination website" commands allow for JavaScript to be redirected to destination URL 412.

Referring to FIG. 7, a short URL 503 is template for access control, which resides on visitor device 301. The client's website is downloaded and displayed with JavaScript 504. JavaScript 504 extracts the unique link ID from the URL 505 and sends a request with information on access control domain 506 and unique link ID 204 to URL shortener server 102. URL shortener server 102 finds and retrieves access control redirection parameters 507 for the received link unique ID 204 in the Database 2 and records the visitor's data as access control visitor data 508. URL shortener server 102 sends the information about access control (e.g. type of access control: password, anti-bot captcha etc.) or JavaScript code that creates the access control redirection parameters 509 back to visitor device 301. Parameters 509 may be, for example, a block on the web page with the field where a visitor can enter a password or captcha, button for confirmation, and other UI elements). The browser on visitor device 301 displays an interstitial page with an access control interstitial page 510. After visitor device 301 provides access to the control information, (e.g. entered password, captcha, answered control question, etc.), access control visitor data 510 is received by URL shortener server 102. The information can be sent in a form of hash of the password, captcha, etc. URL shortener server 102 completes verification of the received information using the information defined by redirection parameters 203. Instances where access control verification 512 is achieved by URL shortener server 102 (i.e., successful verification), URL shortener server 102 sends the destination URL 513 back to visitor device 301. The browser on visitor device 301 receives the destination URL 513 and thus redirects visitor device to that URL 513.

In another variant, URL shortener server 102 can also provide the functionality to create, edit, and save interstitial pages 410. Interstitial pages 410 can be: (a) hosted on the website of URL shortener server 102, client, a third party website, or server and (b) be displayed on visitor device 301 after clicking on short URL 205 prior to redirection to the final destination. The client defines the content of the interstitial page 410 (e.g., adding, editing, or deleting blocks with text, images, videos, links, buttons and other interface elements using the web-page editor provided by URL shortener server 102). URL shortener server 102 provides a feature for the client to: (a) assign the interstitial pages 410 to the client's short URL 205; and (b) collect, view, and export statistics for the visitors (1) clicking on short URL 205, (2) arriving to the client's interstitial page 410, and (3) redirected from the interstitial page 410 to the destination URL 307. Additionally, URL shortener server 102 provides a way for the client to protect the redirection from the interstitial page 410 to the destination URL 307 by the password defined by the client or suggested by URL shortener server 102 or anti-bot captcha. URL shortener server 102 provides a function for transferring the interstitial pages 410 created by one client to another client. Thus, multiple clients can use the same interstitial page 410 with their short URL 205 or short link 206.

In another variant, an anchor is included in short URL 205 as unique link ID 204 by using JavaScript on a website that interacts with URL shortener server 102 and redirects to a final destination address. The unique link ID 204 uses a certain combination of selected letters or words for short URL 205. The interstitial pages 410 that are defined, created, or designed by the client can be redirected with short URL 205 (e.g., shortened URLs). The location of the interstitial page 410 is on the client website. Normally, interstitial page 410 belongs to URL shortener server 102. Redirection occurs from interstitial page 410 using the described method with JavaScript, access control block, or a visitor action defined by the client who created short URL 205. The systems and methods herein are directed to a URL shortening service, which provides infrastructure for redirection, statistics collection, and a webpage editor helping the client create an interstitial page 410. However, the client defines the content of the interstitial page 410. Client device 101 can access or use a page on the client's own website as an interstitial page 410 (or alternatively a page on URL shortener server 102 or third-party domain) for short URL 205, as generated by URL shortener server 102.

The nodes in computing environment of FIG. 1 are computer system/server which is on the form of a general-purpose computing device. The components of computer system/server may include, but are not limited to, one or more processors or processing units, a system memory, and a bus that couples various system components including system memory to processor.

Computer bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server typically includes a variety of computer system readable media. Such media may be any available media that is accessible by a computer system/server, and it includes both volatile and non-volatile media, removable and non-removable media.

System memory can include computer system readable media in the form of volatile memory, such as random access memory (RAM) and/or cache memory. Computer system/server may further include other removable/non-removable, volatile/non-volatile computer system storage media. By way of example only, storage system can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to a bus by one or more data media interfaces. As will be further depicted and described below, the memory may include at least one program product having a set (e.g., at least one) of program modules that are configured to carry out the functions of embodiments of the invention.

Program/utility, having a set (at least one) of program modules, may be stored in memory by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

Computer system/server may also communicate with one or more external devices, such as a keyboard, a pointing device, a display, etc.; one or more devices that enable a user to interact with a computer system/server; and/or any devices (e.g., network card, modem, etc.) that enable computer system/server to communicate with one or more other computing devices. Such communication can occur via Input/Output (I/O) interfaces. Still yet, computer system/server can communicate with one or more networks such as a local area network (LAN), a general wide area network (WAN), and/or a public network (e.g., the Internet) via network adapter. A network adapter communicates with the other components of computer system/server via the bus. It should be understood that although not shown, other hardware and/or software components could be used in conjunction with computer system/server. Examples, include, but are not limited to: microcode, device drivers, redundant processing units, external disk drive arrays, RAID systems, tape drives, data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per set, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical applications, or technical improvement over technologies found in the marketplace, or to enable others of ordinary skill in the art to understand the embodiments disclosed herein.

Other Embodiments

The detailed description set-forth above is provided to aid those skilled in the art in practicing the present invention. However, the invention described and claimed herein is not to be limited in scope by the specific embodiments herein disclosed because these embodiments are intended as illustration of several aspects of the invention. Any equivalent embodiments are intended to be within the scope of this invention. Indeed, various modifications of the invention in addition to those shown and described herein will become apparent to those skilled in the art from the foregoing description which does not depart from the spirit or scope of the present inventive discovery. Such modifications are also intended to fall within the scope of the appended claims.

REFERENCES CITED

All publications, patents, patent applications and other references cited in this application are incorporated herein by reference in their entirety for all purposes to the same extent as if each individual publication, patent, patent application or other reference was specifically and individually indicated to be incorporated by reference in its entirety for all purposes. Citation of a reference herein shall not be construed as an admission that such is prior art to the present invention.

What is claimed is:

1. A method for URL shortening, comprising:
 receiving a domain from a first device;
 generating a unique identification for the domain;
 generating a code, wherein the code is inserted into the domain;
 sending the code to the first device;
 receiving a parameter from the first device;
 generating: (a) a unique link identification and (b) a short link, wherein the unique link identification is based on the parameter;
 sending the short link to the first device, wherein the short link is subsequently received by the second device;
 receiving a URL from the second device, wherein the URL contains the unique link identification and is based on the short link;
 retrieving the unique link identification and the parameter in a database; and
 sending the parameter to the second device, wherein the parameter is one of: instructions for displaying a destination URL, instructions for displaying an interstitial page, and instructions for displaying access control block script with the interstitial page.

2. The method of claim 1, wherein the first device is a client device.

3. The method of claim 1, wherein the second device is a visitor device.

4. The method of claim 1, further comprising: in response to finding the unique link identification in the database, recording data of the second device to the database and sending instructions to display the interstitial page on the second device, wherein the interstitial page comprises a transition block.

5. The method of claim 1, further comprising: in response to finding the unique link identification in the database, recording data of the second device to the database and sending instructions to display the access control block script with the interstitial page on the second device.

6. The method of claim 1, further comprising: in response to finding the unique link identification and the destination URL, recording data of the second device to the database and sending instructions to display the destination URL on the second device.

7. The method of claim 4, wherein the interstitial page is directed to the destination URL in response to processing actions from a user of the second device.

8. The method of claim 5, wherein the interstitial page is directed to the destination URL in response to verifying access control data from a user of the second device.

9. The method of claim 1, further comprising: extracting the unique link identification from the short link.

10. The method of claim 9, further comprising: transforming the extract into the URL by inserting the extract into the URL.

11. A method for URL shortening, comprising:
registering a domain from a first device;
generating a short URL and a destination address;
responsive to generating the short URL, giving a first device access to the destination address;
sending the short URL to the first device;
sending the short URL is sent to second device;
sending the short URL to the destination address; and
sending the destination address directly to the second device, the destination address to the second device via the interstitial page, or the destination address to the second device via access control.

12. A computer implemented system for URL shortening comprises: a processor and memory, with computer readable instructions stored thereon that when read by the processor, cause the processor to:
receive a domain from a first device;
generate a unique identification for the domain;
generate a code, wherein the code is inserted into the website on the domain;
send the code to the first device;
receive a parameter from the first device;
generate: (a) a unique link identification and (b) a short link, wherein the unique link identification, based on the parameter;
send the short link to the first device, wherein the short link is subsequently received by the second device;
receive the URL from the second device, wherein the URL contains the unique link identification and is based on the short link;
retrieve the unique link identification and the set of parameters in a database; and
send the parameter to the second device, wherein the parameter is one of: instructions for displaying a destination URL, instructions for displaying an interstitial page, and instructions for displaying access control block script with the interstitial page.

13. The system of claim 12, wherein the first device is a client device and the second device is a visitor device.

14. The system of claim 12, wherein the instructions further comprise, when read by the processor, cause the processor to: in response to finding the unique link identification in the database, record data of the second device to the database and send instructions to display the interstitial page on the second device, wherein the interstitial page comprises a transition block.

15. The system of claim 12, wherein the instructions further comprise, when read by the processor, cause the processor to: in response to finding the unique link identification in the database, recording data of the second device to the database and sending instructions to display the access control block script with the interstitial page on the second device.

16. The system of claim 12, wherein the instructions further comprise, when read by the processor, cause the processor to: in response to finding the unique link identification and the destination URL, record data of the second device to the database and send instructions to the second device for displaying the destination URL on the second device.

17. The system of claim 14, wherein the interstitial page is directed to the destination URL in response to processing actions from a user of the second device.

18. The system of claim 15, wherein the destination URL is directed by the interstitial page in response to verifying access control data from a user of the second device.

19. The system of claim 12, wherein the instructions further comprise, when read by the processor, cause the processor to extract the unique link identification from the short link.

20. The system of claim 12, further comprising:
a web-editor or an app with an editor of the interstitial page, wherein the web-editor or the app is a part of a URL shortener system in use by the first device to create a website; and
the created website used for short links associated with the first device as an interstitial page displayed on the second device prior to redirecting to the destination URL.

* * * * *